(12) United States Patent
Cargill (10) Patent No.: US 8,572,966 B2
(45) Date of Patent: Nov. 5, 2013

(54) HEAT ENGINE APPARATUS AND METHOD

(76) Inventor: Edward James Cargill, Leduc (CA)

( * ) Notice: Subject to any disclaimer, the term of this patent is extended or adjusted under 35 U.S.C. 154(b) by 960 days.

(21) Appl. No.: 12/691,223

(22) Filed: Jan. 21, 2010

(65) Prior Publication Data

US 2010/0223924 A1    Sep. 9, 2010

(30) Foreign Application Priority Data

Mar. 9, 2009  (CA) .................................. 2654339

(51) Int. Cl.
*F03G 7/00*  (2006.01)

(52) U.S. Cl.
USPC .................................................. 60/641.2

(58) Field of Classification Search
USPC ............................................ 60/641.2–641.4
See application file for complete search history.

(56) References Cited

U.S. PATENT DOCUMENTS

| | | | |
|---|---|---|---|
| 3,522,120 A | | 7/1970 | Beale |
| 3,939,356 A | * | 2/1976 | Loane ............................ 290/52 |
| 3,986,362 A | * | 10/1976 | Baciu ........................... 60/641.2 |
| 4,132,269 A | * | 1/1979 | Chasteen ....................... 166/268 |
| 4,290,266 A | | 9/1981 | Twite et al. |
| 4,805,407 A | | 2/1989 | Buchanan |
| 5,095,705 A | * | 3/1992 | Daly ............................ 60/641.2 |
| 5,183,100 A | * | 2/1993 | Harrell, Jr. ...................... 165/45 |
| 5,272,879 A | | 12/1993 | Wiggs |
| 5,839,508 A | | 11/1998 | Tubel et al. |
| 6,073,448 A | | 6/2000 | Lozada |
| 6,628,040 B2 | | 9/2003 | Pelrine et al. |
| 7,178,337 B2 | | 2/2007 | Pilanz |
| 7,320,218 B2 | | 1/2008 | Silver et al. |
| 7,849,690 B1 | * | 12/2010 | Lakic ........................... 60/641.2 |
| 2005/0097911 A1 | | 5/2005 | Revellat et al. |
| 2006/0075752 A1 | | 4/2006 | Silver et al. |
| 2006/0075753 A1 | | 4/2006 | Silver et al. |
| 2006/0266064 A1 | | 11/2006 | Rowatt |
| 2007/0051107 A1 | | 3/2007 | Bass |
| 2007/0245729 A1 | | 10/2007 | Mickleson |
| 2008/0022683 A1 | | 1/2008 | Ohler et al. |
| 2008/0209904 A1 | | 9/2008 | Sumrall |
| 2008/0223032 A1 | | 9/2008 | Sumrall |
| 2008/0250788 A1 | | 10/2008 | Noel et al. |
| 2010/0319347 A1 | * | 12/2010 | Viernickel .................... 60/641.2 |

* cited by examiner

*Primary Examiner* — Hoang Nguyen
(74) *Attorney, Agent, or Firm* — Terrence N. Kuharchuk; Rodman & Rodman (57) ABSTRACT

A heat engine apparatus for use in association with a borehole and a method of operating a heat engine in association with a borehole. The apparatus includes a first heat exchanger assembly in fluid communication with a proximal segment of the borehole, a second heat exchanger assembly in fluid communication with a distal segment of the borehole, a circulation barrier for providing a seal between the apparatus and the borehole in order to isolate the proximal segment of the borehole and the distal segment of the borehole from each other, and a heat engine associated with the first heat exchanger assembly and the second heat exchanger assembly, wherein the heat engine is a gas phase closed cycle thermodynamic heat engine. The first heat exchanger assembly, the second heat exchanger assembly, the circulation barrier and the heat engine are all adapted to be inserted in the borehole.

52 Claims, 6 Drawing Sheets

FIG. 9

HEAT ENGINE APPARATUS AND METHOD

TECHNICAL FIELD

A heat engine apparatus for use in association with a borehole and a method of operating a heat engine in association with a borehole.

BACKGROUND OF THE INVENTION

Thermodynamic heat engines may be used to convert heat energy to mechanical work. A thermodynamic heat engine relies upon a (relatively) high temperature heat source and a (relatively) low temperature heat sink in order to operate according to a thermodynamic cycle. In general, the greater the temperature difference between the heat source and the heat sink, the higher the efficiency of the thermodynamic heat engine.

A closed cycle thermodynamic heat engine is a thermodynamic heat engine in which a fixed amount of a working fluid is contained within the heat engine, which working fluid is repeatedly subjected to repetitions of the thermodynamic cycle. A gas phase closed cycle thermodynamic heat engine is a closed cycle thermodynamic heat engine in which the working fluid is maintained in a gaseous state throughout the thermodynamic cycle.

A typical thermodynamic cycle for a closed cycle thermodynamic heat engine includes cooling, compression, heating and expansion as basic processes. Non-limiting examples of closed cycle thermodynamic heat engines include those which operate according to the Carnot cycle, the Stirling cycle and the Ericsson cycle.

The Carnot cycle is characterized by a sequence of processes performed on the working fluid which consist of isothermal expansion, adiabatic expansion, isothermal compression, and adiabatic compression.

The Stirling cycle is characterized by a sequence of processes performed on the working fluid which consist of isothermal expansion, cooling at constant volume, isothermal compression, and heating at constant volume.

The Ericsson cycle is characterized by a sequence of processes performed on the working fluid which consist of isothermal expansion, cooling at constant pressure, isothermal compression, and heating at constant pressure.

The efficiency of some closed cycle thermodynamic heat engines can be increased through the use of a regenerator. A regenerator is a heat storage device and secondary heat exchanger which may be interposed between the cooling and heating processes of the heat engine in order to exchange heat with the working fluid and thus retain heat within the system which could otherwise be lost to the environment exterior to the heat engine. Thermodynamic heat engines operating according to the Stirling cycle and the Ericsson cycle frequently include regenerators in order to increase their efficiencies.

The temperature within the earth below the frost line (i.e., about 2 meters below the surface of the earth in Northern countries such as Canada) remains relatively stable throughout the year. An estimate of the average stable year-round ground temperature in Canada at a point within about 1 meter below the frost line is about 5-10 degrees Celsius.

The temperature within the earth below the frost line tends to increase as the distance below the surface (i.e., depth) increases, particularly within the earth's crust. This increase in temperature as a function of depth is referred to as the "geothermal gradient". An estimate of the average geothermal gradient throughout the earth's crust is about thirty degrees Celsius per kilometer (30° C./km).

The temperature within the earth at a location two kilometers below the earth's surface may therefore be about 50-55 degrees Celsius higher than the temperature several meters below the earth's surface.

As a result, the stability of the ground temperature below the frost line and/or the geothermal gradient can potentially be utilized for the operation of a heat engine, such as a closed cycle thermodynamic heat engine.

Geothermal or ground source heat pump systems are known for houses and other buildings. Such systems typically include a heat exchanger located within the building for transferring heat to and from a closed loop containing water or antifreeze as a working fluid, which closed loop extends between the heat exchanger and a location in the ground which is relatively shallow but is below the frost line. The working fluid is typically circulated through the closed loop by a pump. Geothermal or ground source heat pump systems may be used to transfer heat from the ground to the building (i.e., for heating of the building) or to transfer heat from the building to the ground (i.e., for air conditioning of the building).

U.S. Patent Application Publication No. US 2007/0245729 A1 (Mickleson) describes a geothermal energy system comprising an injection borehole, a production borehole, a heat extraction system located at the earth's surface and coupled to the production borehole, piping coupled to and extending between the heat extraction system and the injection borehole, and a spanning borehole portion extending from the injection borehole to the production borehole and extending through hot rock. The heat extraction system may be comprised of a turbine, an exchanger-piping system or a Stirling engine and alternator combination. A geo-fluid is circulated through the geothermal energy system in order to mine heat from hot rock resources and deliver the heat to the heat extraction system.

U.S. Patent Application Publication No. US 2008/0209904 A1 (Sumrall) describes an electrical power generating system including a Stirling engine and a high temperature source coupled to a hot chamber of the Stirling engine, wherein the high temperature source comprises heat from below the earth's surface. In an embodiment of the system, the high temperature source may be a borehole such as a dry hole, an oil well, or a gas well. The low temperature source for the Stirling engine may be comprised of a body of water, in which case the Stirling engine is thermally coupled to the body of water. In some embodiments, the Stirling engine may be located in the body of water.

U.S. Patent Application Publication No. US 2008/0223032 A1 (Sumrall) describes an electrical power generation system similar to that described in U.S. Patent Application Publication No. US 2008/0209904 A1 (Sumrall). The electrical power generation system includes a power generating means comprising a hot junction and a cold junction, wherein the power generating means may be comprised of a thermoelectric generator or alternate power generating means including Stirling engines, Rankin engines, Matteran energy cycle engines, flash power plants, dry steam power plants, binary power plants, flash/binary combined cycles, and the like.

SUMMARY OF THE INVENTION

References in this document to distances, to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

References in this document to "proximal", "distal", "above", "below", "up", "down", and to similar words in the context of the apparatus of the invention or in the context of the borehole should be construed with respect to the farthest distance or "reach" of the borehole relative to a surface location from which the borehole commences, regardless of the actual orientation and/or direction of the apparatus or the borehole.

The present invention is directed at a heat engine apparatus. The apparatus includes components which are adapted to be inserted in a borehole.

The present invention is also directed at a method of using a heat engine in association with a borehole.

In one aspect, the invention is a heat engine apparatus comprising a first heat exchanger assembly, a second heat exchanger assembly, a circulation barrier positioned between the first heat exchanger assembly and the second heat exchanger assembly, and a heat engine associated with the first heat exchanger assembly and the second heat exchanger assembly, wherein the first heat exchanger assembly, the second heat exchanger assembly, the circulation barrier and the heat engine are adapted to be inserted in a borehole.

In another aspect, the invention is a method of operating a heat engine, comprising circulating a first heat exchange fluid between a first heat transfer location and a first heat exchanger assembly located in a proximal segment of a borehole, circulating a second heat exchange fluid between a second heat transfer location located in a distal segment of the borehole and a second heat exchanger assembly located in the distal segment of the borehole, associating a heat engine with the first heat exchanger assembly, associating the heat engine with the second heat exchanger assembly, and operating the heat engine as a result of a temperature difference between the first heat exchanger assembly and the second heat exchanger assembly.

In another aspect, the invention is a heat engine apparatus, the apparatus comprising:
 (a) a first heat exchanger assembly adapted to be inserted in a borehole such that the first heat exchanger assembly is in fluid communication with a proximal segment of the borehole;
 (b) a second heat exchanger assembly adapted to be inserted in the borehole such that the second heat exchanger assembly is in fluid communication with a distal segment of the borehole;
 (c) a circulation barrier adapted to provide a seal between the apparatus and the borehole in order to isolate the proximal segment of the borehole and the distal segment of the borehole from each other; and
 (d) a heat engine adapted to be inserted in the borehole such that the heat engine is associated with the first heat exchanger assembly and the second heat exchanger assembly, wherein the heat engine is a gas phase closed cycle thermodynamic heat engine.

In another aspect, the invention is a method of operating a heat engine in association with a borehole, the method comprising:
 (a) isolating a proximal segment of the borehole from a distal segment of the borehole;
 (b) providing a first heat exchanger assembly in the borehole, wherein the first heat exchanger assembly is in fluid communication with the proximal segment of the borehole;
 (c) providing a second heat exchanger assembly in the borehole, wherein the second heat exchanger assembly is in fluid communication with the distal segment of the borehole;
 (d) providing a heat engine in the borehole, wherein the heat engine is associated with the first heat exchanger assembly and the second heat exchanger assembly, and wherein the heat engine is a gas phase closed cycle thermodynamic heat engine;
 (e) circulating a first heat exchange fluid between a first heat transfer location and the first heat exchanger assembly;
 (f) circulating a second heat exchange fluid between a second heat transfer location located in the distal segment of the borehole and the second heat exchanger assembly; and
 (g) operating the heat engine as a result of a temperature difference between the first heat exchanger assembly and the second heat exchanger assembly.

The heat engine may be comprised of any suitable gas phase closed cycle thermodynamic heat engine, wherein a thermodynamic heat engine is a heat engine which operates on a thermodynamic cycle. As non-limiting examples, the heat engine may be comprised of a thermodynamic heat engine which operates according to a Stirling cycle, a Carnot cycle, or an Ericsson cycle. As non-limiting examples, the thermodynamic heat engine may be a reciprocating heat engine or a rotary heat engine.

In some embodiments the heat engine is a Stirling cycle heat engine. The Stirling cycle heat engine may be comprised of any suitable type of Stirling cycle heat engine, including but not limited to a rotary Stirling engine, an Alpha type Stirling engine, a Beta type Stirling engine, a Gamma type Stirling engine, and a free piston type Stirling engine. In some embodiments the heat engine may be a Beta type Stirling engine or a free piston Beta type Stirling engine.

The heat engine may contain any suitable gas as a working fluid. In some embodiments, the heat engine may contain helium as the working fluid. In some embodiments, the heat engine may contain air as the working fluid.

The apparatus is intended for use in association with a borehole. The borehole may be comprised of any suitable borehole which extends within the earth. The borehole may be a pre-existing borehole which has been drilled for some other purpose, or the borehole may be a borehole which has been drilled specifically for use in the practice of the invention. The borehole may be comprised of a single main borehole, or may be comprised of a main borehole and/or one or more lateral boreholes.

The borehole may be open (i.e., uncased) or may be fully or partially lined with a casing and/or liner. In some embodiments, the borehole is fully lined with a casing and/or a liner. In some embodiments, the borehole is partially lined with a casing and/or liner or is perforated in order to permit an influx of fluids into the borehole for production to a surface location.

In embodiments in which the borehole is fully or partially lined with a casing and/or a liner, the borehole may in this document be considered to be defined by the casing and/or the liner as the circumstances require, unless expressly stated otherwise.

In some embodiments, all of the components of the apparatus may be adapted to be inserted in the borehole. In some embodiments, some of the components of the apparatus may be adapted to be inserted in the borehole, and other components of the apparatus may be adapted to be located outside of the borehole. In some embodiments, some or all of the components of the apparatus may be encased within or coated with a thermal insulating material having a relatively low thermal conductivity in order to minimize unwanted heat transfer between the apparatus and the borehole.

In some embodiments, the first heat exchanger assembly and the second heat exchanger assembly may be identical or similar to each other. In some embodiments, the first heat exchanger assembly and the second heat exchanger assembly may be significantly different from each other in design and construction.

In some embodiments, the first heat exchanger assembly may be comprised of a first fluid inlet and a first fluid outlet, for circulating a first heat exchange fluid through the first heat exchanger assembly. In some embodiments, the first heat exchanger assembly may define a first heat exchanger bore and the first fluid inlet may be comprised of the first heat exchanger bore.

In some embodiments, the second heat exchanger assembly may be comprised of a second fluid inlet and a second fluid outlet, for circulating a second heat exchange fluid through the second heat exchanger assembly. In some embodiments, the second heat exchanger assembly may define a second heat exchanger bore and the second fluid inlet may be comprised of the second heat exchanger bore.

In some embodiments, the apparatus may be further comprised of a first fluid circulation conduit connected with the first heat exchanger bore and adapted to be inserted in the borehole, for circulating the first heat exchange fluid between a first heat transfer location in the proximal segment of the borehole and the first heat exchanger assembly. The first fluid circulation conduit may be comprised of any suitable pipe or conduit, including but not limited to casing pipe, drill pipe, drill collars or tubing. The first circulation conduit may be comprised of a single continuous length of pipe or conduit (such as, for example, coiled tubing), or may be comprised of joints or sections of pipe or conduit connected together.

In some embodiments, the first fluid circulation conduit may be encased within or coated with a thermal insulating material between the first heat transfer location and the first heat exchanger assembly.

In some embodiments, the apparatus may be further comprised of a first conduit heat exchanger located at the first heat transfer location, for transferring heat between the borehole and the first heat exchange fluid at the first heat transfer location.

In some embodiments, the apparatus may be further comprised of a first heat transfer inlet in fluid communication with the first fluid circulation conduit at the first heat transfer location, for enabling the first heat transfer fluid to enter the first fluid circulation conduit at the first heat transfer location. In some embodiments, the first heat transfer inlet may be comprised of any structure, device or apparatus which is suitable for inhibiting solid particles from entering the first fluid circulation conduit. In some embodiments, the first heat transfer inlet may be comprised of a strainer for inhibiting solid particles from entering the first fluid circulation conduit.

In some embodiments, the first fluid circulation conduit may extend past the first heat transfer location to a location proximal of the first heat transfer location. In some embodiments, the first fluid circulation conduit may be provided with a blind end or plug at a location proximal of the first heat transfer inlet in order to prevent the first heat exchange fluid from entering the first fluid circulation conduit at a position other than the first heat transfer inlet.

In some embodiments, the first heat transfer location may be located outside of the borehole. As a result, in some embodiments, the first fluid circulation conduit may extend outside of the borehole so that the first heat transfer inlet is located outside of the borehole. In such embodiments, the borehole may similarly be provided with a casing or liner which extends outside of the borehole in order to facilitate circulation of the first heat exchange fluid.

In some embodiments, the apparatus may be further comprised of a second fluid circulation conduit connected with the second heat exchanger bore and adapted to be inserted in the borehole, for circulating the second heat exchange fluid between a second heat transfer location in the distal segment of the borehole and the second heat exchanger assembly. The second fluid circulation conduit may be comprised of any suitable pipe or conduit, including but not limited to casing pipe, drill pipe, drill collars or tubing. The second circulation conduit may be comprised of a single continuous length of pipe or conduit (such as, for example, coiled tubing), or may be comprised of joints or sections of pipe or conduit connected together.

In some embodiments, the second fluid circulation conduit may be encased within or coated with a thermal insulating material between the second heat transfer location and the second heat exchanger assembly.

In some embodiments, the apparatus may be further comprised of a second conduit heat exchanger located at the second heat transfer location, for transferring heat between the borehole and the second heat exchange fluid at the second heat transfer location.

In some embodiments, the apparatus may be further comprised of a second heat transfer inlet in fluid communication with the second fluid circulation conduit at the second heat transfer location, for enabling the second heat transfer fluid to enter the second fluid circulation conduit at the second heat transfer location. In some embodiments, the second heat transfer inlet may be comprised of any structure, device or apparatus which is suitable for inhibiting solid particles from entering the second fluid circulation conduit. In some embodiments, the second heat transfer inlet may be comprised of a strainer for inhibiting solid particles from entering the second fluid circulation conduit.

In some embodiments, the second fluid circulation conduit may extend past the second heat transfer location to a location distal of the second heat transfer location. In some embodiments, the second fluid circulation conduit may be provided with a blind end or plug at a location distal of the second heat transfer inlet in order to prevent the second heat exchange fluid from entering the second fluid circulation conduit at a position other than the second heat transfer inlet.

The heat engine may be associated with the first heat exchanger assembly and the second heat exchanger assembly in any suitable manner which will facilitate heat transfer amongst the heat engine, the first heat exchanger assembly and the second heat exchanger assembly. In some embodiments, the first heat exchanger assembly and the second heat exchanger assembly may be encased within or coated with a thermal insulating material.

In some embodiments, the heat engine may be comprised of a first end, the first heat exchanger assembly may be comprised of a first heat exchanger shroud, and the first end of the heat engine may be received within the first heat exchanger shroud. In some embodiments, the first fluid inlet and the first fluid outlet may be in communication with the first heat exchanger shroud. In some embodiments, the first heat exchanger shroud may define a plurality of apertures and the first fluid outlet may be comprised of the apertures defined by the first heat exchanger shroud.

In some embodiments, the heat engine may be comprised of a second end, the second heat exchanger assembly may be comprised of a second heat exchanger shroud, and the second end of the heat engine may be received within the second heat exchanger shroud. In some embodiments, the second fluid inlet and the second fluid outlet may be in communication with the second heat exchanger shroud. In some embodiments, the second heat exchanger shroud may define a plurality of apertures and the second fluid outlet may be comprised of the apertures defined by the second heat exchanger shroud.

In some embodiments, the apparatus may be further comprised of a first heat exchanger pump, for pumping the first heat exchange fluid through the first heat exchanger assembly. The first heat exchanger pump may be comprised of any type of pump which is suitable for pumping the first heat exchange fluid.

In some embodiments, the first heat exchanger pump may be adapted to be inserted in the borehole. In some embodiments, the first heat exchanger pump may be interposed between the first heat exchanger assembly and the first fluid circulation conduit. In some embodiments, the first heat exchanger pump may be comprised of an electric pump. In some embodiments, the first heat exchanger pump may be comprised of an electric submersible pump (ESP). In some embodiments, the first heat exchanger pump may be encased within or coated with a thermal insulating material.

In some embodiments, the apparatus may be further comprised of a second heat exchanger pump, for pumping the second heat exchange fluid through the second heat exchanger assembly. The second heat exchanger pump may be comprised of any type of pump which is suitable for pumping the second heat exchange fluid.

In some embodiments, the second heat exchanger pump may be adapted to be inserted in the borehole. In some embodiments, the second heat exchanger pump may be interposed between the second heat exchanger assembly and the second fluid circulation conduit. In some embodiments, the second heat exchanger pump may be comprised of an electric pump. In some embodiments, the second heat exchanger pump may be comprised of an electric submersible pump (ESP). In some embodiments, the second heat exchanger pump may be encased within or coated with a thermal insulating material.

In some embodiments, the first heat exchanger pump and the second heat exchanger pump may be comprised of a single heat exchanger pump. In some embodiments, the first heat exchange fluid and the second heat exchange fluid may be comprised of a single heat exchange fluid which is circulated sequentially through the first heat exchanger assembly and the second heat exchanger assembly and past the first heat transfer location and the second heat transfer location. In such embodiments, a single circulation loop may be provided, which single circulation loop may be comprised of the single heat exchanger pump, the first fluid circulation conduit, the first heat exchange location, the first heat exchanger assembly, the second heat exchanger assembly, the second fluid circulation conduit, and the second heat exchange location.

In some embodiments, the apparatus may be further comprised of a structure, device or apparatus which is suitable for supporting and/or suspending the apparatus in the borehole.

As one non-limiting example, in some embodiments, the apparatus may be further comprised of a hanger for suspending the apparatus in the borehole. The hanger may be comprised of any structure, device or apparatus which is suitable for suspending the apparatus in the borehole. In some embodiments, the hanger may be associated with the first fluid circulation conduit. In some embodiments, the hanger may be associated with the first fluid circulation conduit by being connected with the first fluid circulation conduit.

As a second non-limiting example, in some embodiments, the apparatus may be further comprised of an anchor for anchoring the apparatus in the borehole. The anchor may be comprised of any structure, device or apparatus which is suitable for anchoring the apparatus in the borehole. In some embodiments, the anchor may be associated with the second fluid circulation conduit. In some embodiments, the anchor may be associated with the second fluid circulation conduit by being connected with the second fluid circulation conduit.

In some embodiments, the apparatus may be further comprised of an electrical generator associated with the heat engine, for generating electrical energy from operation of the heat engine. The electrical generator may be comprised of any suitable electrical generator which is compatible for use with the heat engine. As non-limiting examples, the electrical generator may be a rotary generator or a reciprocating (i.e., linear) generator. In some embodiments, the electrical generator may be adapted to be inserted in the borehole. In some embodiments, the electrical generator may be encased within or coated with a thermal insulating material.

In some embodiments, the apparatus may be further comprised of an electrical conduit for conducting electrical energy from the electrical generator to a surface location. In some embodiments, the electrical conduit may extend at least between the electrical generator and the hanger.

In some embodiments, the apparatus may be further comprised of an electrical conduit for conducting electrical energy from the electrical generator to the first heat exchanger pump in order to provide electrical power from the electrical generator to the first heat exchanger pump. In some embodiments, the apparatus may be further comprised of an electrical conduit for conducting electrical energy from the electrical generator to the second heat exchanger pump in order to provide electrical power from the electrical generator to the second heat exchanger pump.

In some embodiments in which the first heat exchanger pump is an electric pump and wherein the first heat exchanger pump is adapted to be inserted in the borehole, the apparatus may be further comprised of an electrical conduit extending at least between the first heat exchanger pump and the hanger, for conducting electrical energy from the surface location to the first heat exchanger pump in order to provide electrical power to the first heat exchanger pump.

In some embodiments in which the second heat exchanger pump is an electric pump and wherein the second heat exchanger pump is adapted to be inserted in the borehole, the apparatus may be further comprised of an electrical conduit extending at least between the second heat exchanger pump and the hanger, for conducting electrical energy from the surface location to the second heat exchanger pump in order to provide electrical power to the second heat exchanger pump.

In some embodiments, the heat engine may be comprised of a reciprocating heat engine and the electrical generator may be comprised of a linear alternator. In some embodiments, the borehole may define a longitudinal axis, the heat engine may be adapted to reciprocate parallel with the longitudinal axis of the borehole, and the electrical generator may be adapted to be aligned with the heat engine along the longitudinal axis of the borehole.

In some embodiments, the apparatus may be adapted to provide a first annulus between the borehole and the apparatus in the proximal segment of the borehole. In some embodiments, the apparatus may be adapted to provide that the first heat exchange fluid circulates in the proximal segment of the borehole from the first heat transfer location to the first heat exchanger assembly through the first circulation conduit and the apparatus may be adapted to provide that the first heat exchange fluid circulates in the proximal segment of the borehole from the first heat exchanger assembly to the first heat transfer location through the first annulus.

In some embodiments, the apparatus may be adapted to provide a second annulus between the borehole and the apparatus in the distal segment of the borehole. In some embodiments, the apparatus may be adapted to provide that the second heat exchange fluid circulates in the distal segment of the borehole from the second heat transfer location to the second heat exchanger assembly through the second circulation conduit and the apparatus may be adapted to provide that the second heat exchange fluid circulates in the distal segment of the borehole from the second heat exchanger assembly to the second heat transfer location through the second annulus.

The circulation barrier may be comprised of any structure, device or apparatus which is suitable for providing a seal between the apparatus and the borehole in order to isolate the proximal segment of the borehole and the distal segment of the borehole from each other. In embodiments in which the borehole is lined with a casing and/or a liner, the seal between the apparatus and the borehole may be effected by a seal between the apparatus and the casing and/or liner.

In some embodiments, the circulation barrier provides a fluid barrier between the proximal segment and the distal segment of the borehole in order to isolate the proximal segment of the borehole and the distal segment of the borehole from each other. In some embodiments, the circulation barrier provides both a fluid barrier and a thermal barrier between the proximal segment and the distal segment of the borehole in order to isolate the proximal segment of the borehole and the distal segment of the borehole from each other.

As a non-limiting example, the circulation barrier may be comprised of a sealing device of a type which may typically be used to provide a seal in a wellbore. As a result, in some embodiments, the circulation barrier may be comprised of a packer. In some embodiments, the packer may be actuatable between a sealing position and a non-sealing position, in order to facilitate movement of the apparatus through the borehole. In some embodiments, the circulation barrier may be constructed in whole or in part from a material having a relatively low thermal conductivity so that the circulation barrier provides both a fluid barrier and a thermal barrier between the proximal segment and the distal segment of the borehole. In some embodiments, the circulation barrier may be constructed in whole or in part from an elastomeric material such as rubber.

The apparatus may be further comprised of a regenerator, for providing a secondary heat transfer to and from a working fluid contained within the heat engine. The regenerator may be comprised of any structure, device or apparatus which is suitable for transferring heat to and from the working fluid.

In some embodiments, the regenerator may be associated with the circulation barrier such that the circulation barrier thermally insulates the regenerator. In some embodiments, the regenerator may be encased within or surrounded by the circulation barrier.

In some embodiments, the apparatus may be comprised of a pipe string which comprises the components of the apparatus. The components of the apparatus may be releasably connected with each other to provide the pipe string, or one or more of the components of the apparatus may be permanently connected with each other or integrally formed with each other to provide the pipe string.

As a first non-limiting example, in some embodiments, the first heat exchanger assembly, the second heat exchanger assembly, the circulation barrier and the heat engine may be comprised of one or more tools or subs which are interposed between the first fluid circulation conduit and the second fluid circulation conduit in order to provide a pipe string.

As a second non-limiting example, in some embodiments, the apparatus may be comprised of a pipe string comprising the hanger, the first fluid circulation conduit connected with the hanger, the first heat exchanger pump connected with the first fluid circulation conduit, the first heat exchanger assembly connected with the first heat exchanger pump, the second heat exchanger assembly connected with the first heat exchanger assembly, the second heat exchanger pump connected with the second heat exchanger assembly, and the second fluid circulation conduit connected with the second heat exchanger assembly.

In such embodiments, the circulation barrier may be interposed between the first heat exchanger assembly and the second heat exchanger assembly as a separate component, or the circulation barrier may be attached to, connected with or mounted upon one or both of the first heat exchanger assembly and the second heat exchanger assembly.

In some embodiments, the apparatus may be further comprised of a control system for monitoring and/or controlling the circulation of the first heat exchange fluid and the second heat exchange fluid through the apparatus and through the borehole in order to optimize the temperature difference between the first heat exchanger assembly and the second heat exchanger assembly. In some embodiments, the control system may be comprised of an electronic controller. In some embodiments, some or all components of the control system may be adapted to be inserted in the borehole.

BRIEF DESCRIPTION OF DRAWINGS

Embodiments of the invention will now be described with reference to the accompanying drawings, in which.

DETAILED DESCRIPTION

The present invention relates to a heat engine apparatus for use in conjunction with a borehole, in which at least some of the components of the apparatus are adapted to be inserted in the borehole.

Four non-limiting exemplary embodiments of a heat engine apparatus according to the invention are described in the description which follows. In the following description of the four embodiments, equivalent features in the embodiments are assigned the same reference numbers.

Figure 1:
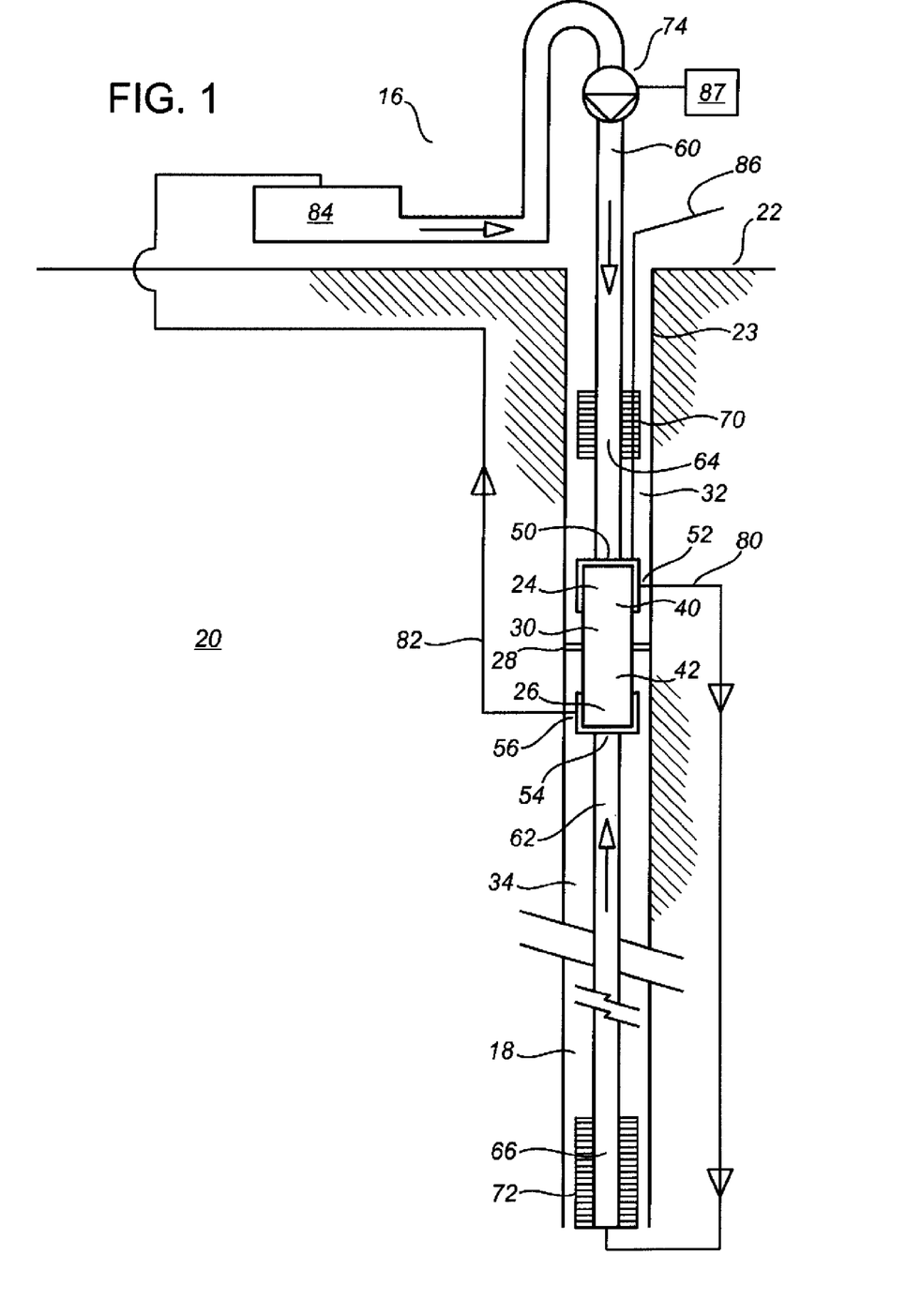
FIG. 1 is a schematic drawing of a first embodiment of the apparatus of the invention.
Figure 2:
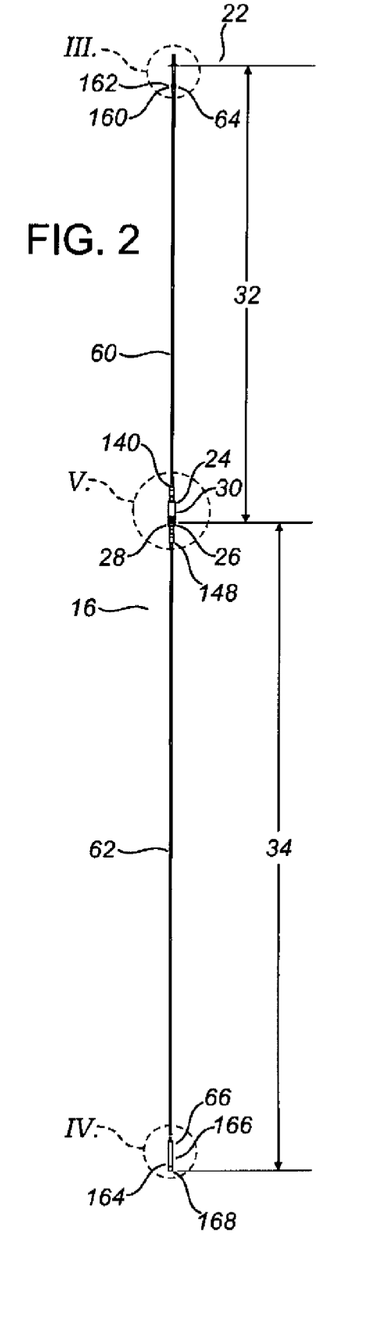
FIG. 2 is an elevation view of a second embodiment of the apparatus of the invention.

Some general principles of the invention are illustrated in FIG. 1. Referring to FIG. 1, a first embodiment of a heat engine apparatus (16) is depicted installed in a borehole (18) which extends within the ground (20) from a surface location (22). In the first embodiment, the borehole (18) is lined with a casing string (23). In the first embodiment, some of the components of the apparatus (16) are located in the borehole (18) and some of the components of the apparatus (16) are located outside of the borehole (18).

The apparatus (16) is comprised of a first heat exchanger assembly (24), a second heat exchanger assembly (26), a circulation barrier (28) and a heat engine (30).

The first heat exchanger assembly (24) is adapted to be inserted in the borehole (18) such that the first heat exchanger assembly (24) is in fluid communication with a proximal segment (32) of the borehole (18).

The second heat exchanger assembly (26) is adapted to be inserted in the borehole (18) such that the second heat exchanger assembly (26) is in fluid communication with a distal segment (34) of the borehole (18).

The circulation barrier (28) is adapted to provide a seal between the apparatus (16) and the borehole (18) in order to isolate the proximal segment (32) of the borehole (18) and the distal segment (34) of the borehole (18) from each other. In the first embodiment of FIG. 1, the circulation barrier (28) is comprised of a packer having an elastomeric seal element, which engages the casing string (23) to provide both a fluid barrier and a thermal barrier between the proximal segment (32) of the borehole (18) and the distal segment (34) of the borehole (18).

The heat engine (30) is adapted to be inserted in the borehole (18) such that the heat engine (30) is associated with the first heat exchanger assembly (24) and the second heat exchanger assembly (26).

The heat engine (30) is a gas phase closed cycle thermodynamic heat engine. In the first embodiment of FIG. 1, the heat engine (30) is a Stirling cycle heat engine. More particularly, in the first embodiment of FIG. 1, the heat engine (30) is a reciprocating free piston Beta type Stirling engine having a first end (40) and a second end (42). In the first embodiment, the heat engine (30) contains an amount of helium as a working fluid (not shown). In the first embodiment, the apparatus (16) may be further comprised of a regenerator (not shown in FIG. 1).

The first heat exchanger assembly (24) is comprised of a first fluid inlet (50) and a first fluid outlet (52), for circulating a first heat exchange fluid through the first heat exchanger assembly (24). The second heat exchanger assembly (26) is comprised of a second fluid inlet (54) and a second fluid outlet (56), for circulating a second heat exchange fluid through the second heat exchanger assembly (26).

In the first embodiment of FIG. 1, the first heat exchange fluid and the second heat exchange fluid are comprised of a single heat exchange fluid which is circulated sequentially through both the first heat exchanger assembly (24) and the second heat exchanger assembly (26), as shown schematically in FIG. 1. In the first embodiment, the single heat exchange fluid is comprised of water, and may be further comprised of a corrosion inhibitor, antifreeze, and/or other substances which may enhance the effectiveness of the single heat exchange fluid.

Referring to FIG. 1, the apparatus (16) is further comprised of a first fluid circulation conduit (60) which is connected with the first fluid inlet (50) and a second fluid circulation conduit (62) which is connected with the second fluid inlet (54). In the first embodiment, the fluid circulation conduits (60,62) are encased within or coated with a thermal insulating material.

The first fluid circulation conduit (60) circulates the single heat exchange fluid between a first heat transfer location (64) in the proximal segment (32) of the borehole (18) and the first heat exchanger assembly (24). The second fluid circulation conduit (62) circulates the single heat exchange fluid between a second heat transfer location (66) in the distal segment (34) of the borehole (18) and the second heat exchanger assembly (26).

In the first embodiment of FIG. 1, the apparatus (16) is further comprised of a first conduit heat exchanger (70) which is located at the first heat transfer location (64) and a second conduit heat exchanger (72) which is located at the second heat transfer location (66).

Referring to FIG. 1, the apparatus (16) is further comprised of a single heat exchanger pump (74) for circulating the single heat exchange fluid sequentially through a circulation loop which includes the single heat exchanger pump (74), the first fluid circulation conduit (60), the first heat transfer location (64), the first heat exchanger assembly (24), the second heat exchanger assembly (26), the second fluid circulation conduit (62), and the second heat transfer location (66). In the first embodiment of FIG. 1, the single heat exchanger pump (74) is positioned at the surface location (22).

As depicted schematically in FIG. 1, the circulation loop also includes a first linking path (80) which links the first fluid outlet (52) with the second fluid circulation conduit (62) and a second linking path (82) which links the second fluid outlet (56) with the single heat exchanger pump (74). These linking paths (80,82) may be comprised of conduits or other suitable fluid pathways which extend through the circulation barrier (28) in order to pass between the proximal segment (32) of the borehole (18) and the distal segment (34) of the borehole (18). In the first embodiment, the linking paths (80,82) are encased within or coated with a thermal insulating material.

As depicted schematically in FIG. 1, the circulation loop also includes a heat exchange fluid reservoir (84).

The first embodiment of FIG. 1 is operated by circulating the single heat exchange fluid through the circulation loop. Beginning at the single heat exchanger pump (74), the single heat exchange fluid is circulated to the first heat transfer location (64) and the first conduit heat exchanger (70).

The first heat transfer location (64) provides a heat sink as a result of its position in the upper portion of the proximal segment (32) of the borehole (18) and the resulting relatively low ground temperature at the first heat transfer location (64). Heat is therefore transferred from the single heat exchange fluid to the first heat transfer location (64) via the first conduit heat exchanger (70) at the first heat transfer location (64).

The single heat exchange fluid is then circulated through the first fluid circulation conduit (60) to the first heat exchanger assembly (24) via the first fluid inlet (50), where heat is transferred from the first end (40) of the heat engine (30) to the single heat exchange fluid.

The single heat exchange fluid exits the first heat exchanger assembly (24) via the first fluid outlet (52) and passes through the first linking path (80) to the second heat transfer location (66) and the second conduit heat exchanger (72).

The second heat transfer location (66) provides a heat source as a result of its position in the lower portion of the distal segment (34) of the borehole (18) and the resulting relatively high ground temperature at the second heat transfer location (66). Heat is therefore transferred from the second heat transfer location (66) to the single heat exchange fluid via the second conduit heat exchanger (72) at the second heat transfer location (66).

The single heat exchange fluid is then circulated through the second fluid circulation conduit (62) to the second heat exchanger assembly (26) via the second fluid inlet (54), where heat is transferred from the single heat exchange fluid to the second end (42) of the heat engine (30).

The single heat exchange fluid exits the second heat exchanger assembly (26) via the second fluid outlet (56) and passes through the second linking path (82) to the heat exchange fluid reservoir (84) and then back to the single heat exchanger pump (74).

The temperature difference between the first heat exchanger assembly (24) and the second heat exchanger assembly (26) enables the heat engine (30) to operate according to a Stirling cycle. The work performed by the heat engine (30) is converted to electrical energy by an electrical generator (not shown in FIG. 1) which is associated with the heat engine (30), which electrical energy is conducted to the surface location (22) via an electrical conduit (86).

The temperature difference between the first heat exchanger assembly (24) and the second heat exchanger assembly (26) and thus the power output and efficiency of the heat engine (30) will depend upon considerations including but not limited to the composition of the single heat exchange fluid, the circulation rate of the single heat exchange fluid, the positions of the first heat transfer location (64) and the second heat transfer location (66), and the characteristics of the conduit heat exchangers (70,72) and the heat exchanger assemblies (24,26).

In the first embodiment, the apparatus (16) is further comprised of a control system (87) for monitoring and/or controlling the operation of the single heat exchanger pump (74) in order to provide some control over the power output and efficiency of the heat engine (30). As depicted in FIG. 1, the control system (87) is located outside of the borehole (18).

A second embodiment of the heat engine apparatus (16) is depicted in FIGS. 2-7. In the second embodiment, the borehole (18) is fully lined with a casing string (23). The casing string (23) terminates at its distal end with a cementing plug (88). The annular space between the borehole (18) and the casing string (23) is filled with cement (89). In the second embodiment, essentially all of the components of the apparatus (16) are located in the borehole (18).

Referring to FIGS. 2-7, the apparatus (16) is comprised of a first heat exchanger assembly (24), a second heat exchanger assembly (26), a circulation barrier (28) and a heat engine (30).

The first heat exchanger assembly (24) is adapted to be inserted in the borehole (18) such that the first heat exchanger assembly (24) is in fluid communication with a proximal segment (32) of the borehole (18).

The second heat exchanger assembly (26) is adapted to be inserted in the borehole (18) such that the second heat exchanger assembly (26) is in fluid communication with a distal segment (34) of the borehole (18).

The circulation barrier (28) is adapted to provide a seal between the apparatus (16) and the borehole (18) in order to isolate the proximal segment (32) of the borehole (18) and the distal segment (34) of the borehole (18) from each other. In the second embodiment of FIGS. 2-7, the circulation barrier (28) is comprised of a packer having an elastomeric seal element, which provides both a fluid barrier and a thermal barrier between the proximal segment (32) of the borehole (18) and the distal segment (34) of the borehole (18).

The heat engine (30) is adapted to be inserted in the borehole (18) such that the heat engine (30) is associated with the first heat exchanger assembly (24) and the second heat exchanger assembly (26).

The heat engine (30) is a gas phase closed cycle thermodynamic heat engine. In the second embodiment of FIGS. 2-7, the heat engine (30) is a Stirling cycle heat engine. More particularly, in the second embodiment of FIGS. 2-7, the heat engine (30) is a reciprocating free piston Beta type Stirling engine having a first end (40) and a second end (42). In the second embodiment, the heat engine (30) contains an amount of helium as a working fluid (not shown).

Figure 5:
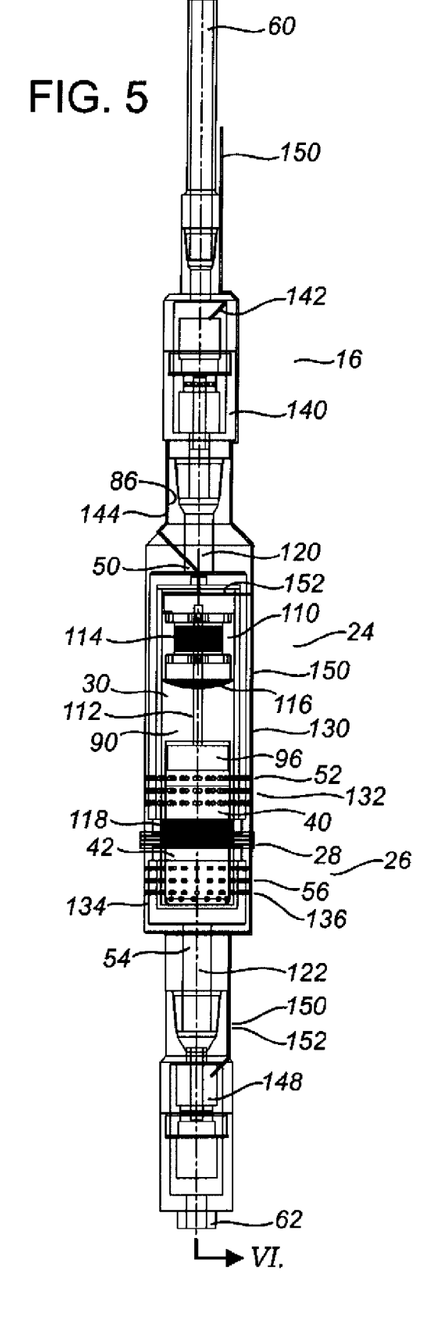
FIG. 5 is a detail partial section view of the first fluid circulation conduit, the first heat exchanger pump, the first heat exchanger assembly, the circulation barrier, the second heat exchanger assembly, the second heat exchanger pump, and the second fluid circulation conduit of the second embodiment of the apparatus of the invention as depicted in FIG. 2.
Figure 6:
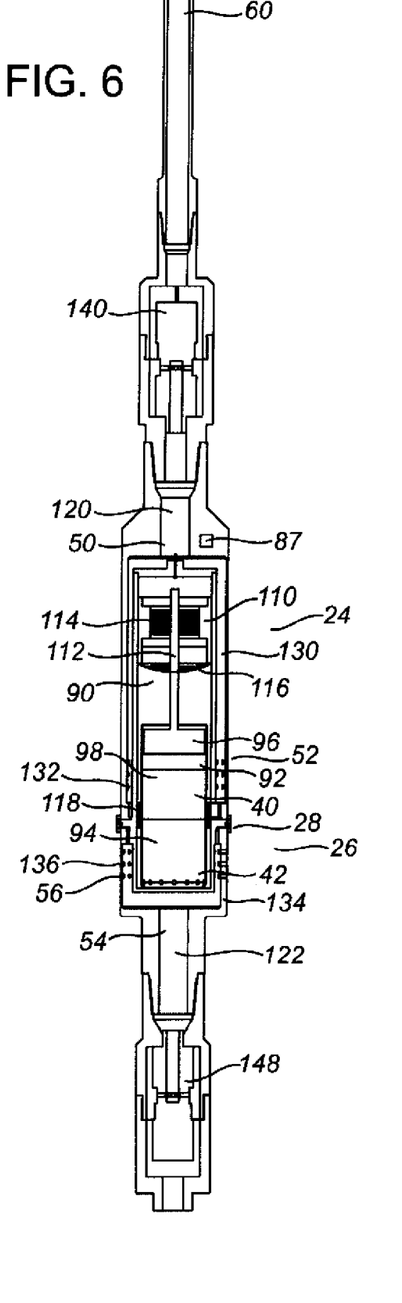
FIG. 6 is a section view of the components of the second embodiment of the apparatus of the invention depicted in FIG. 5, taken along line 6-6 in FIG. 5.

Referring to FIG. 5 and FIG. 6, the heat engine (30) is comprised of a cylinder (90) having a first cylinder end (92) and a second cylinder end (94). The first cylinder end (92) extends within the first end (40) of the heat engine (30). The second cylinder end (94) extends within the second end (42) of the heat engine (30).

The cylinder (90) contains a power piston (96) and a displacer piston (98). The power piston (96) is connected with an electrical generator. In the second embodiment, the electrical generator is a linear alternator (110).

The linear alternator (110) is comprised of an alternator rod (112) which is connected with the power piston (96). The alternator rod (112) includes a permanent magnet. The linear alternator (110) is further comprised of an alternator coil (114). The alternator rod (112) is received within the alternator coil (114). As the power piston (96) reciprocates in the cylinder (90), the alternator rod (112) and thus the permanent magnet reciprocates relative to the alternator coil (114) such that an electric current is induced in the alternator coil (114). The electrical energy induced in the alternator coil (114) is conducted to the surface location (22) by an electrical conduit (86).

The heat engine (30) is driven by a temperature difference between the first end (40) of the heat engine (30) and the second end (42) of the heat engine (30). Heating of the working fluid in the cylinder (90) causes the power piston (96) to move toward the first cylinder end (92). Cooling of the working fluid in the cylinder (90) causes the power piston to move toward the second cylinder end (94). A spring (116) located at the first cylinder end (92) urges the power piston (96) toward the second cylinder end (94).

The displacer piston (98) provides a partition in the cylinder (90), so that the working fluid may be exposed to the temperature at the first end (40) of the heat engine (30) or the second end (42) of the heat engine (30), depending upon the position of the displacer piston (98) in the cylinder (90). In the second embodiment, the displacer piston (98) is a "free piston", and is therefore not linked with the power piston (96). As a result, the displacer piston (98) is moved toward the first cylinder end (92) or the second cylinder end (94) by force differentials acting on the two faces of the displacer piston (98) during the processes of the Stirling cycle.

Referring to FIG. 5 and FIG. 6, the apparatus (16) is further comprised of a regenerator (118). In the second embodiment of FIGS. 2-7, the regenerator (118) is comprised of a secondary heat exchanger which provides a secondary heat transfer to and from the working fluid contained within the heat engine (30). As depicted in FIG. 5 and FIG. 6, the regenerator (118) is comprised of an annular secondary heat exchanger positioned adjacent to the cylinder (90) and surrounded by the circulation barrier (28) such that the regenerator (118) is thermally insulated by the circulation barrier (28).

The first heat exchanger assembly (24) is comprised of a first fluid inlet (50) and a first fluid outlet (52), for circulating a first heat exchange fluid through the first heat exchanger assembly (24). The second heat exchanger assembly (26) is comprised of a second fluid inlet (54) and a second fluid outlet (56), for circulating a second heat exchange fluid through the second heat exchanger assembly (26).

Figure 7:
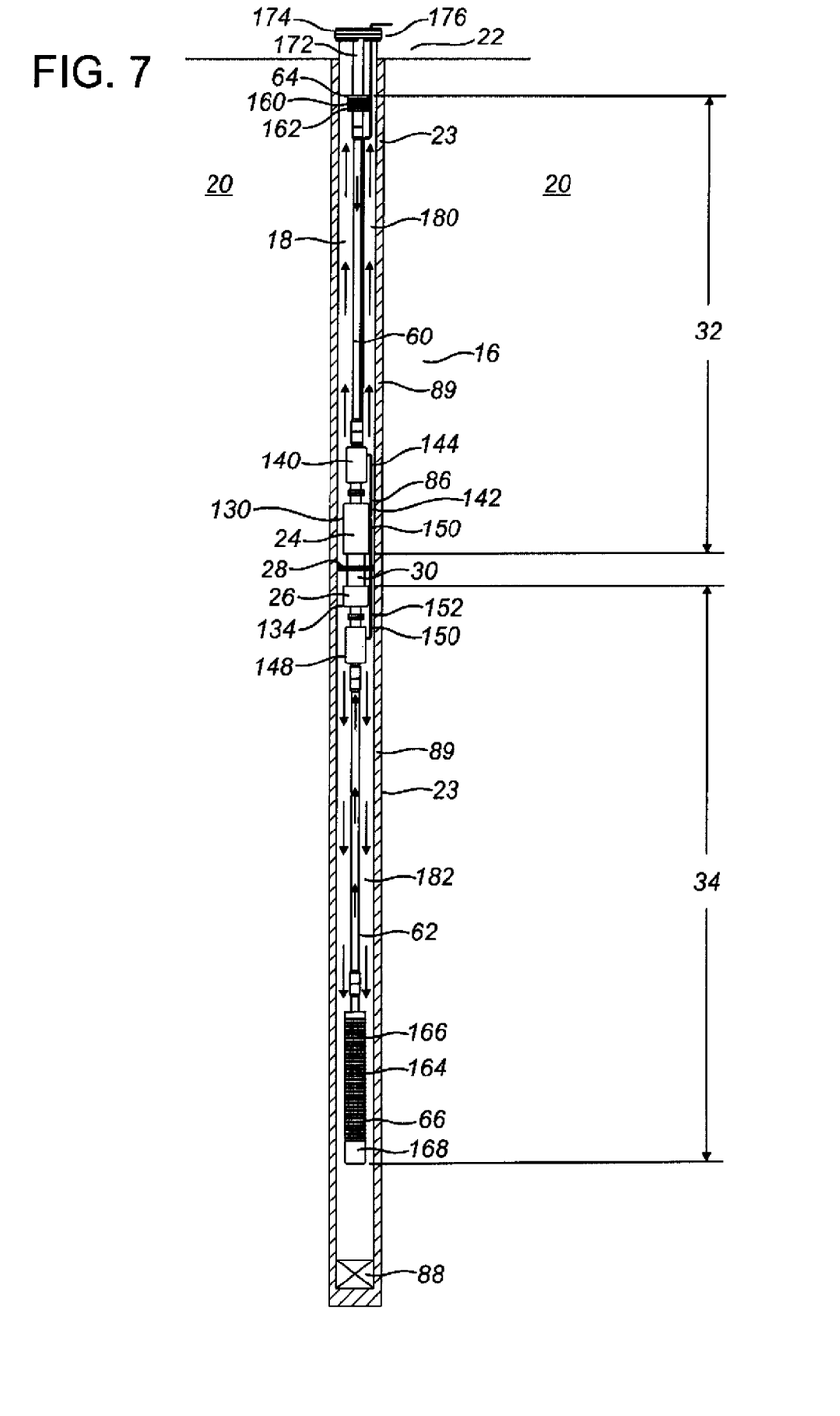
FIG. 7 is a schematic drawing depicting the circulation of the first heat exchange fluid and the second heat exchange fluid in the use of the second embodiment of the apparatus of the invention as depicted in FIG. 2.

In the second embodiment of FIGS. 2-7, the first heat exchange fluid and the second heat exchange fluid are comprised of separate heat exchange fluids which are separately circulated through the first heat exchanger assembly (24) and the second heat exchanger assembly (26) respectively, as shown schematically in FIG. 7. In the second embodiment, the single heat exchange fluid is comprised of water, and may be further comprised of a corrosion inhibitor, antifreeze, and/or other substances which may enhance the effectiveness of the single heat exchange fluid.

In the second embodiment of FIGS. 2-7. the first fluid inlet (50) is comprised of a first heat exchanger bore (120) defined by the first heat exchanger assembly (24) and the second fluid inlet (54) is comprised of a second heat exchanger bore (122) defined by the second heat exchanger assembly (26).

Referring to FIG. 5 and FIG. 6, the first heat exchanger assembly (24) is further comprised of a first heat exchanger shroud (130). The first end (40) of the heat engine (30) is received within the first heat exchanger shroud (130). The first heat exchanger bore (120) is in fluid communication with the first heat exchanger shroud (130). The first heat exchanger shroud (130) defines a plurality of apertures (132). The first fluid outlet (52) is comprised of the apertures (134) in the first heat exchanger shroud (130).

Similarly, referring to FIG. 5 and FIG. 6, the second heat exchanger assembly (26) is further comprised of a second heat exchanger shroud (134). The second end (42) of the heat engine (30) is received within the second heat exchanger shroud (134). The second heat exchanger bore (122) is in fluid communication with the second heat exchanger shroud (134). The second heat exchanger shroud (134) defines a plurality of apertures (136). The second fluid outlet (56) is comprised of the apertures (136) in the second heat exchanger shroud (134).

The first heat exchanger shroud (130) and the second heat exchanger shroud (134) are isolated from each other so that there is no fluid communication between the first heat exchanger shroud (130) and the second heat exchanger shroud (134).

Referring to FIGS. 2-7, the apparatus (16) is further comprised of a first fluid circulation conduit (60) which is connected with the first fluid inlet (50) and a second fluid circulation conduit (62) which is connected with the second fluid inlet (54). In the second embodiment, the fluid circulation conduits (60,62) are encased within or coated with a thermal insulating material.

A first heat exchanger pump (140) is interposed between the first fluid inlet (50) and the first fluid circulation conduit (60), for pumping the first heat exchange fluid through the first heat exchanger assembly (24). In the second embodiment, the first heat exchanger pump (140) is an electric pump, and more particularly is an electric submersible pump (ESP). An electrical conduit (142) extends from the first heat exchanger pump (140) to the surface location (22). Optionally, a separate electrical conduit (144) may be provided between the linear alternator (110) and the first heat exchanger pump (140) so that the first heat exchanger pump (140) may obtain electrical power from the linear alternator (110).

A second heat exchanger pump (148) is interposed between the second fluid inlet (54) and the second fluid circulation conduit (62), for pumping the second heat exchange fluid through the second heat exchanger assembly (26). In the second embodiment, the second heat exchanger pump (148) is an electric pump, and more particularly is an electric submersible pump (ESP). An electrical conduit (150) extends from the second heat exchanger pump (148) to the surface location (22). Optionally, a separate electrical conduit (152) may be provided between the linear alternator (110) and the second heat exchanger pump (148) so that the second heat exchanger pump (148) may obtain electrical power from the linear alternator (110).

The first fluid circulation conduit (60) circulates the first heat exchange fluid between a first heat transfer location (64) in the proximal segment (32) of the borehole (18) and the first heat exchanger assembly (24). The second fluid circulation conduit (62) circulates the second heat exchange fluid between a second heat transfer location (66) in the distal segment (34) of the borehole (18) and the second heat exchanger assembly (26).

In the second embodiment of FIGS. 2-7, the apparatus (16) is further comprised of a first heat transfer inlet (160) which is in fluid communication with the first fluid circulation conduit (60) at the first heat transfer location (64). The first heat transfer inlet (160) permits the first heat transfer fluid to enter the first fluid circulation conduit (60) at the first heat transfer location (64). In the second embodiment, the first heat transfer inlet (160) is comprised of a strainer (162) for inhibiting solid particles from entering the first fluid circulation conduit (60).

In the second embodiment of FIGS. 2-7, the apparatus (16) is further comprised of a second heat transfer inlet (164) which is in fluid communication with the second fluid circulation conduit (62) at the second heat transfer location (66). The second heat transfer inlet (164) permits the second heat transfer fluid to enter the second fluid circulation conduit (62) at the second heat transfer location (66). In the second embodiment, the second heat transfer inlet (164) is comprised of a strainer (166) for inhibiting solid particles from entering the second fluid circulation conduit (62). A blind end (168) is provided in the second fluid circulation conduit (62) at a location distal of the second heat transfer location (66) so that the second heat transfer fluid may only enter the second fluid circulation conduit (62) via the second heat transfer inlet (164).

Figure 3:
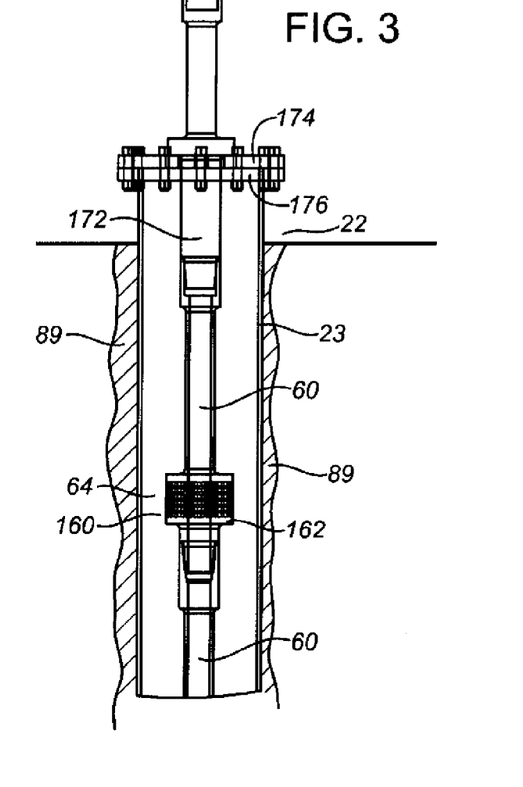
FIG. 3 is a detail view of proximal components of the second embodiment of the apparatus of the invention as depicted in FIG. 2.
Figure 4:
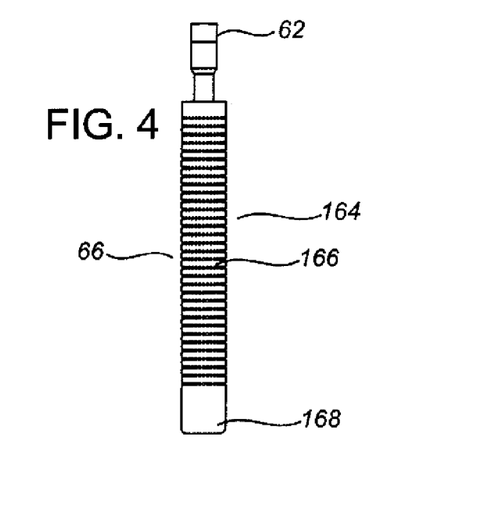
FIG. 4 is a detail view of distal components of the second embodiment of the apparatus of the invention as depicted in FIG. 2.

Referring to FIG. 3 and FIG. 7, in the second embodiment the apparatus (16) is further comprised of a hanger (172) associated with the proximal end of the first fluid circulation conduit (60), for suspending the apparatus (16) in the borehole (18). In the second embodiment, the hanger (172) is comprised of a flanged member which is threadably connected with the first fluid circulation conduit (60) and which is supported at the surface location (22) by a casing cap (174) which is associated with a casing flange (176) located at a proximal end of the casing string (88). In the second embodiment, a blind end is provided in the hanger (172) so that the first heat exchange fluid may only enter the first fluid circulation conduit (60) via the first heat transfer inlet (160).

In the second embodiment, the apparatus (16) is adapted to be inserted in the borehole (18) so that none of the components of the apparatus (16) are located outside of the casing string (23). In addition, the apparatus (16) is adapted to provide a first annulus (180) between the borehole (18) and the apparatus (16) in the proximal segment (32) of the borehole (18) and a second annulus (182) between the borehole (18) and the apparatus (16) in the distal segment of the borehole (18). Referring to FIG. 7, the first annulus (180) and the second annulus (182) are defined by the space between the apparatus (16) and the casing string (23).

The second embodiment of FIGS. 2-7 is operated by circulating the first heat exchange fluid through a first circulation loop which includes the first heat transfer inlet (160), the first fluid circulation conduit (60), the first heat exchanger pump (140), the first heat exchanger assembly (24) and the first annulus (180), and by circulating the second heat exchange fluid through a second circulation loop which includes the second heat transfer inlet (164), the second fluid circulation conduit (62), the second heat exchanger pump (148), the second heat exchanger assembly (26) and the second annulus (182).

The first heat exchange fluid enters the first fluid circulation conduit (60) from the first annulus (180) via the first heat transfer inlet (160) and the first heat exchange fluid returns to the first annulus (180) from the first heat exchanger assembly (24) via the first fluid outlet (52), which is comprised of the apertures (132) in the first heat exchanger shroud (130). Similarly, the second heat exchange fluid enters the second fluid circulation conduit (62) from the second annulus (182) via the second heat transfer inlet (164) and the first heat exchange fluid returns to the second annulus (182) from the second heat exchanger assembly (26) via the second fluid outlet (56), which is comprised of the apertures (136) in the second heat exchanger shroud (134).

The first heat transfer location (64) provides a heat sink as a result of its position in the upper portion of the proximal segment (32) of the borehole (18) and the resulting relatively low ground temperature at the first heat transfer location (64), which causes the first heat transfer fluid to be relatively cool when it enters the first heat transfer inlet (160) at the first heat transfer location (64).

The first heat transfer fluid is then circulated through the first fluid circulation conduit (60) to the first heat exchanger assembly (24) via the first heat exchanger pump (140) and the first fluid inlet (50), where heat is transferred from the first end (40) of the heat engine (30) to the first heat exchange fluid.

The heated first heat exchange fluid exits the first heat exchanger assembly (24) via the apertures (132) in the first heat exchanger shroud (130) and passes through the first annulus (180) back to the first heat transfer inlet (160). The first heat exchange fluid is cooled as it passes through the first annulus (180) toward the first heat transfer inlet (160).

The second heat transfer location (66) provides a heat source as a result of its position in the lower portion of the distal segment (34) of the borehole (18) and the resulting relatively high ground temperature at the second heat transfer location (66), which causes the second heat transfer fluid to be relatively warm when it enters the second heat transfer inlet (164) at the second heat transfer location (66).

The second heat transfer fluid is then circulated through the second fluid circulation conduit (62) to the second heat exchanger assembly (26) via the second heat exchanger pump (148) and the second fluid inlet (54), where heat is transferred from the second heat exchange fluid to the second end (42) of the heat engine (30).

The cooled second heat exchange fluid exits the second heat exchanger assembly (26) via the apertures (136) in the second heat exchanger shroud (134) and passes through the second annulus (182) back to the second heat transfer inlet (164). The second heat exchange fluid is heated as it passes through the second annulus (182) toward the second heat transfer inlet (164).

The temperature difference between the first heat exchanger assembly (24) and the second heat exchanger assembly (26) enables the heat engine (30) to operate according to a Stirling cycle. The work performed by the heat engine (30) is converted to electrical energy by the linear alternator (110), which electrical energy is conducted to the surface location (22) via the electrical conduit (86).

The temperature difference between the first heat exchanger assembly (24) and the second heat exchanger assembly (26) and thus the power output and efficiency of the heat engine (30) will depend upon considerations including but not limited to the compositions of the heat exchange fluids, the pumping rates of the heat exchanger pumps (140, 148), the positions of the heat transfer inlets (160,164), and the characteristics of the heat exchanger assemblies (24,26).

Referring to FIG. 6, in the second embodiment, the apparatus (16) is further comprised of a control system (87) for monitoring and/or controlling the operation of the heat exchanger pumps (140,148) in order to provide some control over the power output and efficiency of the heat engine (30). As depicted in FIG. 6, the control system (87) is contained within a cavity in the first heat exchanger assembly (24), and is therefore adapted to be inserted in the borehole (18).

Figure 8:
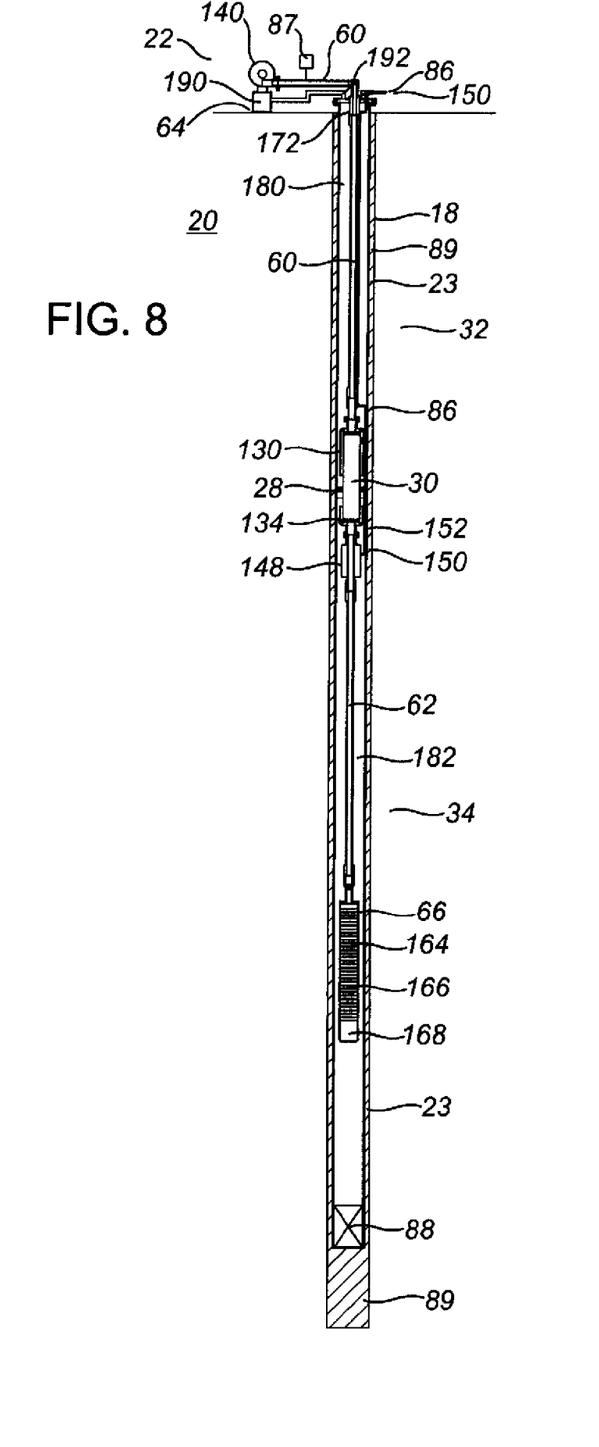
FIG. 8 is an elevation view of a third embodiment of the apparatus of the invention.

A third embodiment of the heat engine apparatus (16) is depicted in FIG. 8. In the third embodiment, the borehole (18) is fully lined with a casing string (23). The casing string (23) terminates at its distal end with a cementing plug (88). The annular space between the borehole (18) and the casing string (23) is filled with cement (89).

In the third embodiment, the first heat exchanger pump (140) and the first heat transfer location (64) are located outside of the borehole (18). The third embodiment is therefore particularly suited for use in climates in which air temperatures outside of the borehole (18) may be lower than the stable year-round ground temperature below the frost line (i.e., less than about 5-10 degrees Celsius).

In all other respects, the third embodiment is essentially identical to the second embodiment. As a result, the description of the third embodiment will include only a description of the first circulation loop in order to illustrate the essential differences between the second embodiment and the third embodiment.

Referring to FIG. 8, the third embodiment of FIG. 8 is operated by circulating the first heat exchange fluid through a first circulation loop which includes a first surface heat exchanger (190), the first heat exchanger pump (140), the first fluid circulation conduit (60), the first heat exchanger assembly (24), the first annulus (180), and a first fluid return line (192). As in previous embodiments, the first fluid circulation conduit (60) is encased within or coated with a thermal insulating material.

The first heat exchange fluid enters the first fluid circulation conduit (60) from the first annulus (180) via the first surface heat exchanger (190) and the first heat exchanger pump (140) and the first heat exchange fluid returns to the first annulus (180) from the first heat exchanger assembly via the first fluid outlet (52), which is comprised of the apertures (132) in the first heat exchanger shroud (130).

The first heat transfer location (64) provides a heat sink as a result of its position outside of the borehole (18). Heat is therefore transferred from the first heat exchange fluid to the first heat transfer location (64) via the first surface heat exchanger (190) at the first heat transfer location (64).

The first heat exchange fluid is then circulated through the first fluid circulation conduit (60) to the first heat exchanger assembly (24) and the first inlet (50), where heat is transferred from the first end (40) of the heat engine (30) to the first heat exchange fluid.

The heated first heat exchange fluid exits the first heat exchanger assembly (24) via the apertures (132) in the first heat exchanger shroud (130) and passes through the first annulus (180) and the first fluid return line (192) back to the first surface heat exchanger (190) at the first heat transfer location (64). The first heat transfer fluid may be cooled as it passes through the first annulus (180) toward the first heat transfer location (64).

In the third embodiment, the apparatus (16) is further comprised of a control system (87) for monitoring and/or controlling the operation of the heat exchanger pumps (140,148) in order to provide some control over the power output and efficiency of the heat engine (30). As depicted in FIG. 8, the control system (87) is located outside of the borehole (18).

Figure 9:
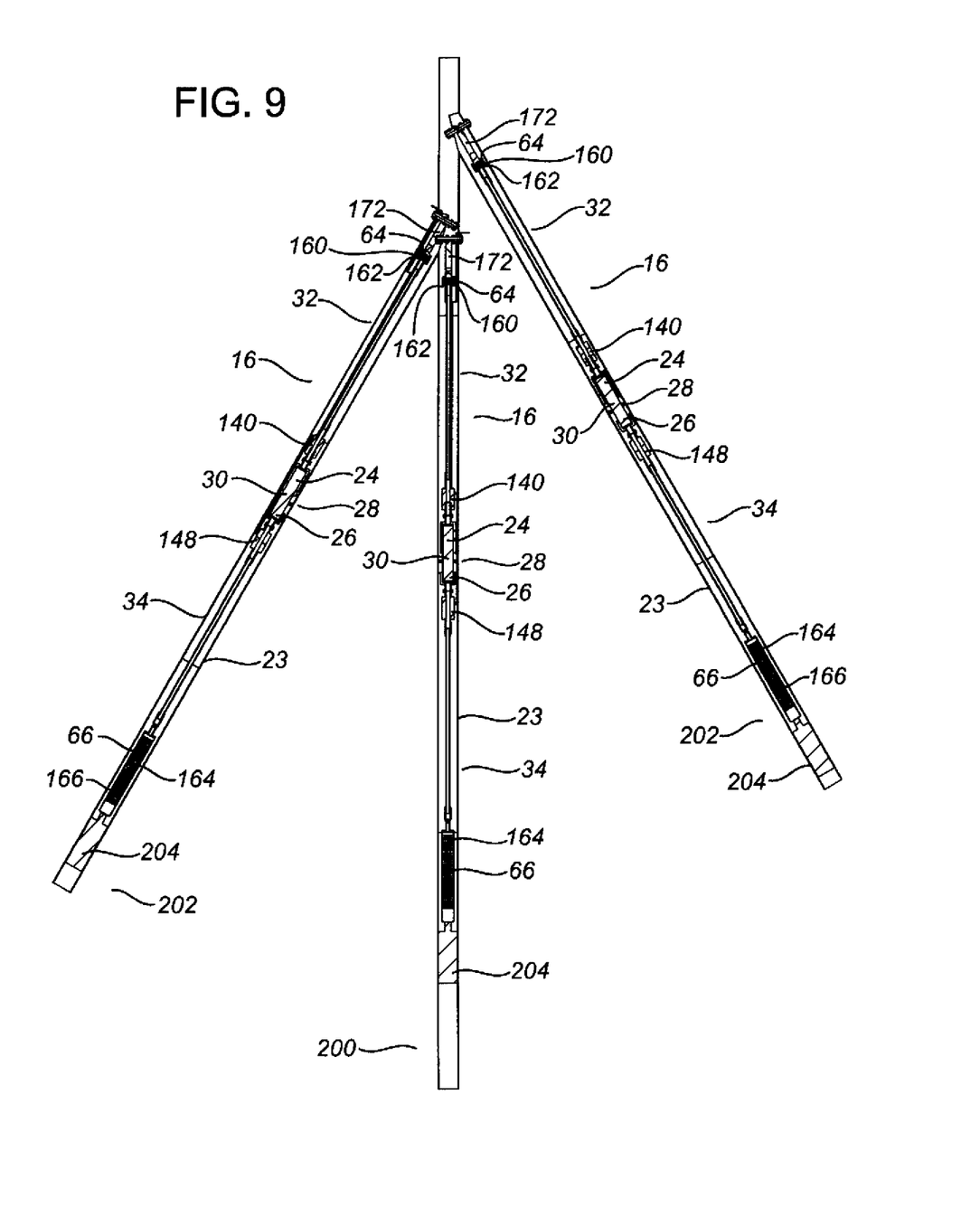
FIG. 9 is an elevation view of a fourth embodiment of the apparatus of the invention.

A fourth embodiment of the heat engine apparatus (16) is depicted schematically in FIG. 9. In the fourth embodiment, the borehole (18) is comprised of a primary borehole (190) and two lateral boreholes (192).

In the fourth embodiment, a separate heat engine apparatus (16) similar to the second embodiment of the apparatus (16) is located in each of the primary borehole (190) and the two lateral boreholes (192). Each of the three apparatus (16) are suspended in their respective boreholes (190,192) by a hanger (172) and are anchored in their respective boreholes (190, 192) by an anchor (204). The hanger (172) is connected with the first fluid circulation conduit (60) and the anchor (204) is connected with the second fluid circulation conduit (62).

In the fourth embodiment, each of the separate heat engine apparatus (16) are operated in the same manner as the apparatus (16) of the second embodiment.

In the fourth embodiment, the three apparatus (16) may be comprised of separate control systems (not shown in FIG. 9) or a single control system for monitoring and/or controlling the operation of the heat exchanger pumps (140,148) in order to provide some control over the power output and efficiency of the heat engines (30). The control system or control systems may be located in the borehole (18) or outside of the borehole (18).

In all embodiments, the apparatus (16) of the invention may be used in association with any borehole (18) which can provide a suitable temperature difference between the first end (40) and the second end (42) of the heat engine (30).

As one non-limiting example, if the second embodiment of the apparatus (16) is used in association with a borehole (18) having a vertical depth of about 700 meters, the ground temperature within about 1 meter below the frost line may be about 5 degrees Celsius, while the ground temperature at the depth of 600 meters may be about 20 degrees Celsius. As a result, the temperature difference between the ends (40,42) of the heat engine (30) may be about 15 degrees Celsius.

As a second non-limiting example, if the third embodiment of the apparatus (16) is used in association with a borehole (18) having a vertical depth of about 700 meters, the ground temperature at the surface location (22) may be below 0 degrees Celsius during winter months, so that the temperature difference between the ends (40,42) of the heat engine may be greater than about 20 degrees Celsius.

In other embodiments of the heat engine apparatus (16), the apparatus (16) may be adapted to produce fluids from the borehole (16). For example, in the first embodiment and the third embodiment of the apparatus (16), the casing string (23) may be perforated or a portion of the borehole (16) may be uncased so that fluids can enter the borehole (16) from the surrounding ground (20). Such fluids may be commingled with the single heat transfer fluid or the first heat transfer fluid and may be recovered from the borehole (16) as the heat transfer fluid is circulated to the surface location (22).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A heat engine apparatus, the apparatus comprising:
   (a) a first heat exchanger assembly adapted to be inserted in a borehole such that the first heat exchanger assembly is in fluid communication with a proximal segment of the borehole;
   (b) a second heat exchanger assembly adapted to be inserted in the borehole such that the second heat exchanger assembly is in fluid communication with a distal segment of the borehole;
   (c) a circulation barrier adapted to provide a seal between the apparatus and the borehole in order to isolate the proximal segment of the borehole and the distal segment of the borehole from each other; and
   (d) a heat engine adapted to be inserted in the borehole such that the heat engine is associated with the first heat exchanger assembly and the second heat exchanger assembly, wherein the heat engine is a gas phase closed cycle thermodynamic heat engine.

2. The apparatus as claimed in claim 1 wherein the first heat exchanger assembly is comprised of a first fluid inlet and a first fluid outlet, for circulating a first heat exchange fluid through the first heat exchanger assembly.

3. The apparatus as claimed in claim 2, further comprising a first heat exchanger pump, for pumping the first heat exchange fluid through the first heat exchanger assembly.

4. The apparatus as claimed in claim 3 wherein the first heat exchanger pump is adapted to be inserted in the borehole.

5. The apparatus as claimed in claim 1 wherein the second heat exchanger assembly is comprised of a second fluid inlet and a second fluid outlet, for circulating a second heat exchange fluid through the second heat exchanger assembly.

6. The apparatus as claimed in claim 5, further comprising a second heat exchanger pump, for pumping the second heat exchange fluid through the second heat exchanger assembly.

7. The apparatus as claimed in claim 6 wherein the second heat exchanger pump is adapted to be inserted in the borehole.

8. The apparatus as claimed in claim 2 wherein the second heat exchanger assembly is comprised of a second fluid inlet and a second fluid outlet, for circulating a second heat exchange fluid through the second heat exchanger assembly.

9. The apparatus as claimed in claim 1, further comprising a regenerator adapted to be inserted in the borehole, for providing a secondary heat transfer to and from a working fluid contained within the heat engine.

10. The apparatus as claimed in claim 8 wherein the first heat exchanger assembly defines a first heat exchanger bore and wherein the first fluid inlet is comprised of the first heat exchanger bore.

11. The apparatus as claimed in claim 8 wherein the second heat exchanger assembly defines a second heat exchanger bore and wherein the second fluid inlet is comprised of the second heat exchanger bore.

12. The apparatus as claimed in claim 10 wherein the second heat exchanger assembly defines a second heat exchanger bore and wherein the second fluid inlet is comprised of the second heat exchanger bore.

13. The apparatus as claimed in claim 12, further comprising a first fluid circulation conduit connected with the first heat exchanger bore and adapted to be inserted in the borehole, for circulating the first heat exchange fluid between a first heat transfer location and the first heat exchanger assembly.

14. The apparatus as claimed in claim 13 wherein the first heat transfer location is adapted to be located in the proximal segment of the borehole, further comprising a first heat transfer inlet in fluid communication with the first fluid circulation conduit at the first heat transfer location.

15. The apparatus as claimed in claim 14 wherein the first heat transfer inlet is comprised of a strainer.

16. The apparatus as claimed in claim 12, further comprising a second fluid circulation conduit connected with the second heat exchanger bore and adapted to be inserted in the borehole, for circulating the second heat exchange fluid between a second heat transfer location in the distal segment of the borehole and the second heat exchanger assembly.

17. The apparatus as claimed in claim 16, further comprising a second heat transfer inlet in fluid communication with the second fluid circulation conduit at the second heat transfer location.

18. The apparatus as claimed in claim 17 wherein the second heat transfer inlet is comprised of a strainer.

19. The apparatus as claimed in claim 13, further comprising a second fluid circulation conduit connected with the second heat exchanger bore and adapted to be inserted in the borehole, for circulating the second heat exchange fluid between a second heat transfer location in the distal segment of the borehole and the second heat exchanger assembly.

20. The apparatus as claimed in claim 12 wherein the heat engine is comprised of a first end, wherein the first heat exchanger assembly is comprised of a first heat exchanger shroud, and wherein the first end of the heat engine is received within the first heat exchanger shroud.

21. The apparatus as claimed in claim 20 wherein the first fluid inlet and the first fluid outlet are in fluid communication with the first heat exchanger shroud.

22. The apparatus as claimed in claim 21 wherein the first heat exchanger shroud defines a plurality of apertures and wherein the first fluid outlet is comprised of the apertures defined by the first heat exchanger shroud.

23. The apparatus as claimed in claim 12 wherein the heat engine is comprised of a second end, wherein the second heat exchanger assembly is comprised of a second heat exchanger shroud, and wherein the second end of the heat engine is received within the second heat exchanger shroud.

24. The apparatus as claimed in claim 23 wherein the second fluid inlet and the second fluid outlet are in fluid communication with the second heat exchanger shroud.

25. The apparatus as claimed in claim 24 wherein the second heat exchanger shroud defines a plurality of apertures and wherein the second fluid outlet is comprised of the apertures defined by the second heat exchanger shroud.

26. The apparatus as claimed in claim 20 wherein the heat engine is comprised of a second end, wherein the second heat exchanger assembly is comprised of a second heat exchanger shroud, and wherein the second end of the heat engine is received within the second heat exchanger shroud.

27. The apparatus as claimed in claim 8, further comprising an electrical generator associated with the heat engine and adapted to be inserted in the borehole, for generating electrical energy from operation of the heat engine.

28. The apparatus as claimed in claim 27 wherein the heat engine is a reciprocating heat engine and wherein the electrical generator is comprised of a linear alternator.

29. The apparatus as claimed in claim 28 wherein the borehole defines a longitudinal axis, wherein the heat engine is adapted to reciprocate parallel with the longitudinal axis of the borehole, and wherein the electrical generator is adapted to be aligned with the heat engine along the longitudinal axis of the borehole.

30. The apparatus as claimed in claim 8 wherein the heat engine is a Stirling cycle heat engine.

31. The apparatus as claimed in claim 19, further comprising a hanger associated with the first fluid circulation conduit, for suspending the apparatus in the borehole.

32. The apparatus as claimed in claim 31, further comprising a first heat exchanger pump, for pumping the first heat exchange fluid through the first heat exchanger assembly, and further comprising a second heat exchanger pump, for pumping the second heat exchange fluid through the second heat exchanger assembly.

33. The apparatus as claimed in claim 32 wherein the second heat exchanger pump is adapted to be inserted in the borehole.

34. The apparatus as claimed in claim 32 wherein the first heat transfer location is adapted to be located in the proximal segment of the borehole, further comprising a first heat transfer inlet in fluid communication with the first fluid circulation conduit at the first heat transfer location and further comprising a second heat transfer inlet in fluid communication with the second fluid circulation conduit at the second heat transfer location.

35. The apparatus as claimed in claim 34 wherein the first heat transfer inlet is comprised of a strainer and wherein the second heat transfer inlet is comprised of a strainer.

36. The apparatus as claimed in claim 34, further comprising an electrical generator associated with the heat engine and adapted to be inserted in the borehole, for generating electrical energy from operation of the heat engine.

37. The apparatus as claimed in claim 36 wherein the heat engine is a reciprocating heat engine and wherein the electrical generator is comprised of a linear alternator.

38. The apparatus as claimed in claim 37 wherein the borehole defines a longitudinal axis, wherein the heat engine is adapted to reciprocate parallel with the longitudinal axis of the borehole, and wherein the electrical generator is adapted to be aligned with the heat engine along the longitudinal axis of the borehole.

39. The apparatus as claimed in claim 37 wherein the heat engine is a Stirling cycle heat engine.

40. The apparatus as claimed in claim 36 wherein the heat engine is comprised of a first end, wherein the first heat exchanger assembly is comprised of a first heat exchanger shroud, and wherein the first end of the heat engine is received within the first heat exchanger shroud.

41. The apparatus as claimed in claim 40 wherein the heat engine is comprised of a second end, wherein the second heat exchanger assembly is comprised of a second heat exchanger shroud, and wherein the second end of the heat engine is received within the second heat exchanger shroud.

42. The apparatus as claimed in claim 41 wherein the first fluid inlet and the first fluid outlet are in fluid communication with the first heat exchanger shroud and wherein the second fluid inlet and the second fluid outlet are in fluid communication with the second heat exchanger shroud.

43. The apparatus as claimed in claim 42 wherein the first heat exchanger shroud defines a plurality of apertures and wherein the first fluid outlet is comprised of the apertures defined by the first heat exchanger shroud.

44. The apparatus as claimed in claim 43 wherein the second heat exchanger shroud defines a plurality of apertures and wherein the second fluid outlet is comprised of the apertures defined by the second heat exchanger shroud.

45. The apparatus as claimed in claim 42, further comprising an electrical conduit extending between the electrical generator and the hanger for conducting the electrical energy generated by the electrical generator to a surface location.

46. The apparatus as claimed in claim 45 wherein the first heat exchanger pump is interposed between the first heat exchanger assembly and the first fluid circulation conduit and wherein the second heat exchanger pump is interposed between the second heat exchanger assembly and the second fluid circulation conduit.

47. The apparatus as claimed in claim 46 wherein the first heat exchanger pump is an electric pump and wherein the second heat exchanger pump is an electric pump, further comprising an electrical conduit extending between the first heat exchanger pump and the hanger for conducting electrical energy from the surface location to the first heat exchanger pump, and further comprising an electrical conduit extending between the second heat exchanger pump and the hanger for conducting electrical energy from the surface location to the second heat exchanger pump.

48. The apparatus as claimed in claim 45 wherein the apparatus is adapted to provide a first annulus between the borehole and the apparatus in the proximal segment of the borehole and wherein the apparatus is adapted to provide a second annulus between the borehole and the apparatus in the distal segment of the borehole.

49. The apparatus as claimed in claim 48 wherein the apparatus is adapted to provide that the first heat exchange fluid circulates in the proximal segment of the borehole from the first heat transfer location to the first heat exchanger assembly through the first circulation conduit and to provide that the first heat exchange fluid circulates in the proximal segment of the borehole from the first heat exchanger assembly to the first heat transfer location through the first annulus.

50. The apparatus as claimed in claim 49 wherein the apparatus is adapted to provide that the second heat exchange fluid circulates in the distal segment of the borehole from the second heat transfer location to the second heat exchanger assembly through the second circulation conduit and to provide that the second heat exchange fluid circulates in the distal segment of the borehole from the second heat exchanger assembly to the second heat transfer location through the second annulus.

51. The apparatus as claimed in claim 50, further comprising a regenerator adapted to be inserted in the borehole, for providing a secondary heat transfer to and from a working fluid contained within the heat engine.

52. The apparatus as claimed in claim 51 wherein the heat engine is a Stirling cycle heat engine.

* * * * *